United States Patent [19]

Itoh

[11] 3,710,148

[45] Jan. 9, 1973

[54] RIPPLE ELIMINATING CIRCUIT

[75] Inventor: Hisatsugu Itoh, Hachioji, Japan

[73] Assignee: Hitachi, Ltd., Tokyo, Japan

[22] Filed: Aug. 31, 1971

[21] Appl. No.: 176,611

[30] Foreign Application Priority Data

Aug. 31, 1970 Japan ................................45/75538

[52] U.S. Cl. ......................307/295, 321/10, 333/80, 328/165

[51] Int. Cl. ................................................H03k 1/16

[58] Field of Search......................................307/295; 328/165–167; 330/20, 25, 35; 321/10; 333/80

[56] References Cited

UNITED STATES PATENTS

| | | | |
|---|---|---|---|
| 3,550,030 | 12/1970 | Blanyer | 321/10 |
| 3,564,456 | 2/1971 | Denny | 307/295 |
| 3,510,753 | 5/1970 | Lawn | 321/10 |
| 3,372,287 | 3/1968 | Metcalf | 307/295 |
| 3,322,970 | 5/1967 | Barreau | 307/295 |

OTHER PUBLICATIONS

Bartlett "Boucherto s Constant–Current Networks" Pages 373–376, 4/27/1926.

Higuchi "Active Equivalent Series Resistance Filter" Pages 623–524, Vol. 14, No. 2, July 1971; IBM Tech. Disclos. Bull.

*Primary Examiner*—John S. Heyman

*Assistant Examiner*—R. E. Hart

*Attorney*—Craig, Antonelli & Hill

[57] ABSTRACT

A ripple eliminating circuit including in series a high power DC source, a capacitor and a negative capacitance circuit having a negative capacitance the absolute value of which is nearly equal to that of said capacitor wherein an output is derived from across the circuit having in series said capacitor and said negative capacitance circuit.

15 Claims, 10 Drawing Figures

INVENTOR
HISATSUGU ITOH
BY
Craig, Antonelli & Hill
ATTORNEYS

INVENTOR

HISATSUGU ITOH

BY Craig, Antonelli & Hill

ATTORNEYS

RIPPLE ELIMINATING CIRCUIT

BACKGROUND OF THE INVENTION

1. Field of the Invention

This invention relates to ripple eliminating circuits used for a high power DC source of a scanning electron microscope, X-ray micro-analyzer and the like.

2. Description of the Prior Art

The presence of a ripple is undesirable in most cases with respect to the performance of a device operated from a high power DC source.

In a scanning electron microscope, for example, a ripple contained in the high power source causes a chromatic aberration in the electron beam and lowers the resolution of the microscope to a considerable extent.

To avoid this problem, the high power source is normally provided with a ripple eliminating circuit.

In the prior art, the ripple eliminating circuit including a resistor and a capacitor connected in series has been in use. This circuit is simple; however, there are difficulties in sufficiently increasing the electrostatic capacity of the capacitor because, for example, the size of the capacitor is limited. This is why it has hardly been possible to obtain a sufficiently large ripple attenuation factor in the conventional circuit.

The so-called pseudo mirror integrator comprising two capacitors and an amplifier has been proposed for use in place of said capacitor. The aim of this integrator is to increase the apparent electrostatic capacitance and thus to increase the ripple attenuation factor.

In the pseudo mirror integrator, however, the capacitors are connected directly to the high power source and, hence, the use of two high peak-resistant capacitors is indispensable and results in a high cost. Furthermore, when the amplifier gain is increased, the stability of the circuit is lowered. As a consequence, the amplifier gain cannot be sufficiently increased and it is limited to an increase in the ripple attenuation factor.

SUMMARY OF THE INVENTION

In view of the foregoing, a principal object of this invention is to provide a ripple eliminating circuit which provides a sufficiently large ripple attenuation factor.

Another object of this invention is to provide a relatively inexpensive ripple eliminating circuit.

A further object of this invention is to provide an operably stable ripple eliminating circuit.

Briefly, with the above objects in mind, the ripple eliminating circuit of this invention is constituted of a negative impedance generating circuit.

DETAILED DESCRIPTION OF THE INVENTION

Figure 1:
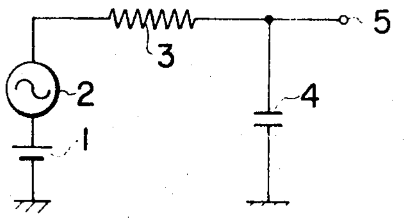
FIG. 1 PRIOR ART
FIG. 1 is a circuit diagram showing a conventional ripple eliminating circuit comprising an R-C circuit.

Referring to FIG. 1, there is shown a conventional ripple eliminating circuit wherein a ripple eliminating circuit comprising a resistor 3 and a capacitor 4 is connected to a high power source comprising a DC source 1 and a ripple source 2, and thus a high voltage having no ripple is derived from the output terminal 5. This ripple eliminating circuit comprising an R-C circuit is simple in the structure; however, there are difficulties in sufficiently increasing the electrostatic capacity because, for example, it is limited to an arbitrary increase in the size of the capacitor 4. This makes it impossible to obtain a sufficiently large ripple attenuation factor.

Figure 2:
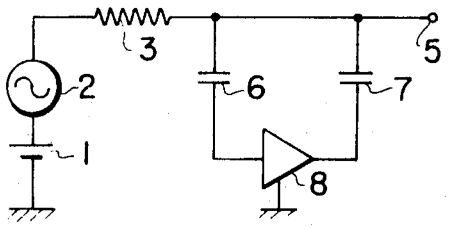
FIG. 2 PRIOR ART
FIG. 2 is a circuit diagram showing a conventional ripple eliminating circuit comprising a pseudo mirror integrator circuit.

In FIG. 2, another conventional ripple eliminating circuit is shown. This circuit is of the so-called pseudo mirror integrator comprising a resistor 3, capacitors 6 and 7 and an amplifier 8.

In this circuit, it is assumed that the capacity of the capacitor 6 is negligible. Then the apparent electrostatic capacity of the circuit is expressed as $(1+G)C_1$. (The gain of the amplifier 8 is represented by $-G$, and the capacity of the capacitor 7 by $C_1$.) Therefore, by increasing the gain G, the apparent electrostatic capacity can be increased.

According to this prior art, however, the use of two high peak-resistant capacitors is required and the cost of the circuit is inevitably increased. Furthermore, when the amplifier gain is increased, the circuit operation becomes unstable. This makes it difficult to improve the ripple attenuation factor.

On the other hand, the ripple eliminating circuit of this invention is operable without fear of the foregoing problems.

Figure 3:
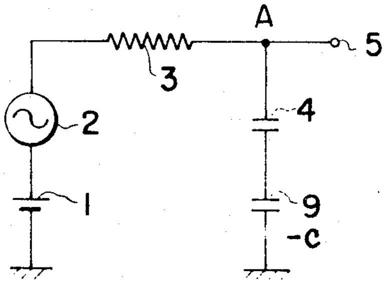
FIG. 3 is a basic circuit diagram showing a ripple eliminating circuit embodying this invention.

Referring to FIG. 3, there is illustrated a principle of this invention.

FIG. 3 shows an R-C ripple eliminating circuit comprising a resistor 3 and a capacitor 4, to which capacitor 9 is connected in series. The equivalent capacity $C_2$ between the output terminal 5 of the circuit and ground is expressed as follows.

$$C_2=(C_3\cdot C_4)/(C_3+C_4) \qquad (1)$$

where $C_3$ denotes the capacity of capacitor 4, and $C_4$ the capacity of capacitor 9.

If $C_4=-C_3$, the equivalent capacity $C_2$ becomes infinite, to reduce the ripple voltage to a large extent.

Even if $C_4$ is not exactly equal to $-C_3$, the equivalent capacity $C_2$ takes a considerably large value.

Namely, when $C_4 = C_3 - \Delta C$, the equivalent capacitance $C_2$ is given as follows from Equation (1).

$$C_2=\frac{(C_3-\Delta C)C_3}{-\Delta C}=\left(1+\frac{C_3}{\Delta C}\right)C_3 \qquad (2)$$

Hence, if $\Delta C > 0$, this means that the capacity $C_3$ of capacitor 4 is increased by $(1+C_3/\Delta C)$ times.

The capacity of capacitor 9 is negative. Practically, there is no available negative capacitance element. Such an element, however, can be approximated by a circuit arrangement.

Figure 4:
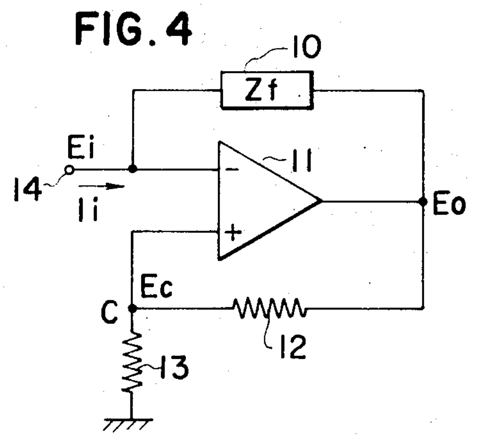
FIG. 4 is a circuit diagram showing a negative impedance generating circuit used for the purpose of this invention.

FIG. 4 shows a circuit in which a negative impedance is realized by the use of feedback technique. In FIG. 4, the reference 10 denotes an impedance element, 11 an amplifier, 12 and 13 resistors and 14 an input terminal.

In this circuit, the output of the amplifier 11 is negatively fed back to its input via the impedance element 10 and positively fed back to its input via the resistor 12.

The input impedance of the circuit on the right seen from the input terminal 14 is calculated in the following manner.

It is assumed that the gain of the amplifier 11 is sufficiently greater than 1 and that the circuit as a whole is in the state of negative feedback. Also, assume that the input voltage to the input terminal 14 is $Ei$, the input current is $Ii$, the amplifier output voltage is $Eo$, the voltage at point C is $Ec$, and the impedance of impedance element 10 is $Zf$. Then, since the gain G of the amplifier 11 is sufficiently large, $Ec$ can be considered to be equal to $Ei$. Namely, $$Ec=Ei \quad (3)$$

When the output of the amplifier 11 is fed back to the point C at the feedback factor $\beta$ ($<1$), the following relationship is obtained from Equation (3).

$$Ei=Ec=\beta Eo \quad (4)$$

When the input current to the amplifier 11 is negligibly small, the following equation is established.

$$IiZf=Ei-Eo \quad (5)$$

From Equations (4) and (5), the following equation is obtained.

$$IiZf=-(1-\beta)/(\beta)\ Ei \quad (6)$$

Therefore, the input impedance $Zi$ of the circuit on the right seen from the input terminal 14 is given as $$Zi=Ei/Ii=-(\beta)/(1-\beta)\ Zf \quad (7)$$

When $\beta=\frac{1}{2}$, $$Zi=-Zf \quad (8)$$

Thus, by arranging the circuit as in FIG. 4 based on the above principle, it is possible to realize a negative impedance. Namely, the circuit as in FIG. 4 is used for capacitor 9 in FIG. 3, and a capacitor having the capacitance $C_4$ is used for the impedance element in FIG. 4.

In order to operate the amplifier loop (FIG. 4) stably, the circuit as a whole must be in the state of negative feedback. However, if only a capacitor is used as the impedance element 10, no feedback is effected on the DC component, and the DC operating point drifts. To stabilize the operation, a resistor is inserted in parallel to the capacitor.

Figure 5:
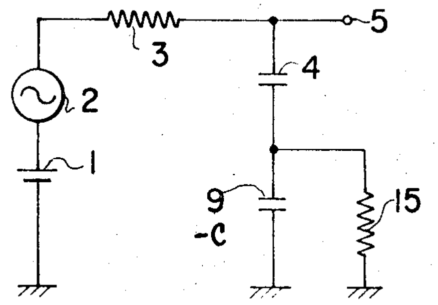
FIGS. 5 and 6 are basic circuit diagrams showing other ripple eliminating circuits of this invention.

FIG. 5 shows a ripple eliminating circuit of this invention wherein a resistor 15 is inserted in parallel with the capacitor 9 for stabilizing the operation of the amplifier loop. This resistor is a negative resistor.

Figure 6:
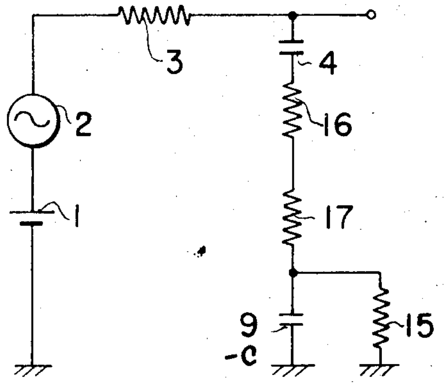

FIG. 6 shows another ripple eliminating circuif of this invention.

In the circuit in FIG. 5, an active element as in FIG. 4 is connected to the high voltage circuit via the capacitor 4. In the event of discharge in the high voltage circuit, the active element may be damaged due to flow of a large current via the capacitor 4.

To avoid this, a resistor 16 is inserted in series to the capacitor 4 as shown in FIG. 6 for the protection against overcurrent due to discharge. By arrangement, however, the ripple attenuation factor remains unchanged at more than a certain frequency.

To solve such a problem, a negative resistor 17 is connected in series to the protecting resistor 16, to let the resistor 17 compensate for the resistor 16, where the resistance value of the resistor 17 is $-R_1$ when that of the resistor 16 is $R_1$. Thus the influence of the resistor 16 on the ripple eliminating function is nearly perfectly removed.

Figure 7A:
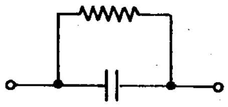
FIGS. 7*a* and 7*b* are circuit diagrams showing in concrete the impedance element used for the circuit as in FIG. 4.
Figure 7B:
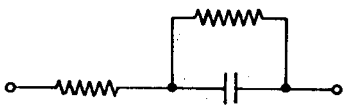

To realize the circuits as in FIGS. 5 and 6, the impedance elements as in FIGS. 7*a* and 7*b* are used for the impedance element 10 shown in FIG. 4.

Figure 8:
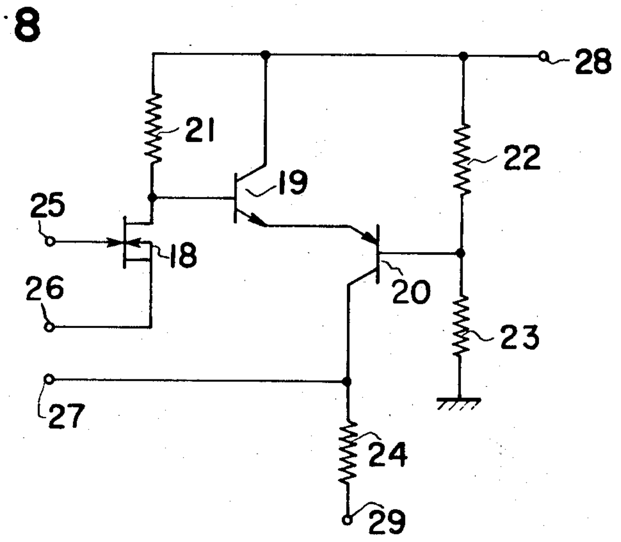
FIG. 8 is a circuit diagram showing a concrete example of the amplifier used for the circuit as in FIG. 4.

FIG. 8 shows in concrete an example of amplifier 11 shown in FIG. 4. In FIG. 8, the reference numeral 18 denotes a coupling type field effect transistor, 19 and 20 transistors, 21 through 24 resistors, 25 a negative feedback input terminal, 26 a positive feedback input terminal, 27 an output terminal, and 28 and 29 positive and megative voltage source terminals respectively.

In this circuit, the coupling type field effect transistor 18 is used as the first stage transistor.

Figure 9:
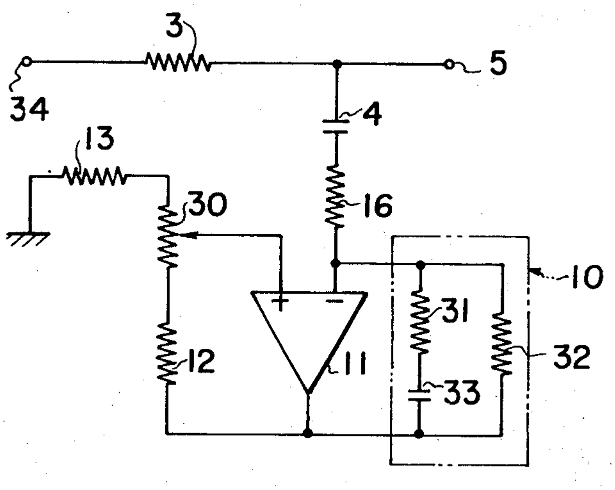
FIG. 9 is a circuit diagram showing a ripple eliminating circuit of this invention associating the circuit as in FIG. 4.

FIG. 9 shows in concrete a circuit for realizing the arrangement as in FIG. 6. In FIG. 9, the reference 30 denotes a slide resistor, 31 and 32 resistors, 33 a capacitor, and 34 a high voltage input terminal. The other references denote the same elements as shown in the foregoing figures. The resistors 31 and 32 and the capacitor 33 correspond to the elements as shown in FIG. 7*b*. In this embodiment, the feedback factor $\beta$ can be adjusted by adjusting the resistance value of the slide resistor 30.

According to this invention, as has been described above, a circuit for generating a negative impedance is used as the impedance element and thus a sufficiently high ripple attenuation factor is realized. Furthermore, the use of only one high peak-resistant capacitor suffices. Hence the invention makes it possible to produce a highly efficient ripple eliminating circuit at a low cost.

What I claim is:

1. A ripple eliminating circuit comprising: high power source input means; a resistor one end of which is connected to said input means; a capacitor having a specific capacity; negative capacitance means having a negative capacity the absolute value of which is nearly equal to that of said capacitor; and coupling means for connecting said capacitor in series to said negative capacitance means and for connecting one end of said series circuit having said capacitor and said negative capacitance means to the other end of said resistor and also for connecting the other end of said series circuit to said input means; wherein an output is derived from the other end of said resistor.

2. A ripple eliminating circuit in accordance with claim 1, in which said negative capacitance means comprises, an amplifier; an impedance element; means for negatively feeding back the output of said amplifier to its input side by way of said impedance element; and means for positively feeding back the output of said amplifier to its input side.

3. A ripple eliminating circuit in accordance with claim 1, in which a negative resistance means is connected in parallel to said negative capacitance means.

4. A ripple eliminating circuit comprising: high power source input means; a first resistor which one end is connected to said input means; a capacitor having a specific capacity; a second resistor; first negative resistance means having a negative resistance the absolute value of which is nearly equal to that of said second resistor; negative capacitance means having a negative capacity the absolute value of which is nearly equal to that of said capacitor; second negative resistance means; a first coupling means for connecting in parallel said negative capacitance means and said second negative resistance means and thereby forming a parallel circuit; second coupling means for connecting in series said capacitor, said second resistor, said first negative resistance means and said parallel circuit thereby forming a series circuit; third coupling means for connecting one end of said series circuit to the other end of said first resistor; fourth coupling means for connecting the other end of said series circuit to said input means; and means for deriving an output from the other end of said first resistor.

5. A ripple eliminating circuit comprising: an input terminal for receiving input voltage; an output terminal; a first resistor element connected in series between said input terminal and said output terminal; and a capacitor circuit connected between said output terminal and a source of reference potential, said capacitor circuit including a first capacitor, one end of which is connected to said output terminal and means for simulating a negative capacitance couplied between the other end of said first capacitor and said source of reference potential.

6. A circuit according to claim 5, further including a second resistor element connected in parallel with said negative capacitor simulating means.

7. A circuit according to claim 6, further including a third resistor element and a negative resistance element connected in series to couple said other end of said first capacitor to said negative capacitance simulating means.

8. A circuit according to claim 5, wherein said negative capacitance simulating means comprises an amplifier circuit having a first and second input terminal, and an output terminal, one of said input terminals of said amplifier being coupled to said first capacitor and being connected to a negative feedback circuit to said output terminal of said amplifier,and the other input terminal of said amplifier is coupled to said source of reference potential and to said output terminal of said amplifier.

9. A circuit according to claim 8, wherein said negative feedback circuit comprises a series resistor-capacitor network connected in parallel with an additional resistor element.

10. A circuit according to claim 8, wherein said negative feedback circuit comprises a parallel connection of a resistor and a capacitor.

11. A circuit according to claim 8, wherein said other input terminal of said amplifier is connected to a variable resistor, one end of which is resistively connected to said source of reference potential and the other end of said variable resistor is resistably connected to said output terminal of said amplifier.

12. a circuit according to claim 11, further including a resistor coupling said one input terminal of said amplifier to said first capacitor.

13. A circuit according to claim 8, wherein said amplifier comprises a field-effect transistor, one electrode of which is connected to a first additional transistor, one electrode of said first additional transistor being connected to one electrode of a second additional transistor, another electrode of said second additional transistor being connected to said output terminal.

14. A circuit according to claim 13, wherein the gate and source electrodes of said field-effect transistor are connected to said one and other input terminals of said amplifier.

15. A circuit according to claim 14, wherein the drain electrode of said field-effect transistor is connected to the base electrode of said first additional transistor, the emitter electrode of said first additional transistor is connected to the emitter electrode of said second additional transistor, and the collector electrode of said second additional transistor is connected to the output terminal of said amplifier.

* * * * *